United States Patent [19]

Pudsey

[11] Patent Number: 5,014,342
[45] Date of Patent: May 7, 1991

[54] COMMUNICATION SYSTEM EMPLOYING A NINE CHANNEL PATTERN ALLOCATION TO ELIMINATE INTERFERENCE

[75] Inventor: David G. Pudsey, Essex, United Kingdom

[73] Assignee: GEC-Marconi Limited, Stanmore, United Kingdom

[21] Appl. No.: 365,575

[22] Filed: Jun. 14, 1989

[30] Foreign Application Priority Data

Jun. 15, 1988 [GB] United Kingdom ............... 8814176

[51] Int. Cl.[5] .............................................. H04B 7/00
[52] U.S. Cl. ........................................ 455/33; 455/3; 455/56
[58] Field of Search ..................................... 455/33-34, 455/54, 56, 66, 63

[56] References Cited

U.S. PATENT DOCUMENTS

| 3,898,390 | 8/1975 | Wells et al. | 455/33 |
| 4,479,226 | 10/1984 | Prabhu et al. | 455/33 |
| 4,562,572 | 12/1985 | Goldman et al. | 455/33 |

FOREIGN PATENT DOCUMENTS

| 1461624 | 1/1977 | United Kingdom . |
| 1472211 | 5/1977 | United Kingdom . |
| 1564053 | 4/1980 | United Kingdom . |

Primary Examiner—Reinhard J. Eisenzopf
Assistant Examiner—Lisa D. Charouel
Attorney, Agent, or Firm—Spencer & Frank

[57] ABSTRACT

In a communication system having a plurality of base stations for communication with mobile terminals, each station is allocated one of nine communication channels. The allocation is arranged such that adjacent channels are spaced further apart than non-adjacent channels so as to eliminate interference.

1 Claim, 3 Drawing Sheets

COMMUNICATION SYSTEM EMPLOYING A NINE CHANNEL PATTERN ALLOCATION TO ELIMINATE INTERFERENCE

BACKGROUND OF THE INVENTION

This invention relates to communication systems and more particularly to systems having a network of fixed base stations with which mobile terminals communicate.

In communication systems in which each base station is allocated a frequency channel for communication, it is necessary to ensure that those stations operating on the same channel are separated by a large enough distance so as to reduce any interference between them to acceptable levels. Interference may also occur between base stations operating on adjacent frequency channels. The physical distribution of base stations is also governed by the degree of coverage of the region required and, in the case of air-to-ground applications, stations must be spaced close enough together to ensure that aircraft at low altitudes are in line-of-sight with at least one base station.

One known air-to-ground communication system operates on seven channels and has a network of ground stations distributed as shown in FIG. 1. Each point reepresents a ground station and the associated reference numeral indicates the channel on which it operates. As can be seen, the ground stations are arranged in a hexagonal pattern in such a way that no ground station is arranged immediately adjacent another ground station operating on the same channel. Typically, the stations are spaced 200 nautical miles apart. Thus, ground stations operating on the same channel are spaced at 529 nautical miles apart. With this arrangement, aircraft at an altitude of less than 46,000 ft. Will not experience interference between ground stations operating on the same channel. At lower altitudes, in this case below 8,700 ft, aircraft may not be within line-of-sight of a ground station because of the curvature of the earth. As the normal operating height for local flights is between 15,000 and 35,000 ft, this spacing of ground stations is regarded as being a reasonable compromise, although special provisions are required near airports.

Each station is surrounded by ground stations which are allocated to the other six channels, so that stations operating on adjacent channels are spaced apart by 200 nautical miles. An aircraft at 26,000 ft. over one station has a line-of-sight of 200 nautical miles and can therefore receive an adjacent ground station operating on a channel adjacent to that of the ground station below. If it is desired to receive the adjacent station, the adjacent channel signal is 33 dB higher. This factor, together with the receiver filtering, sets the minimum spacing between adjacent channels.

SUMMARY OF THE INVENTION

The present invention arose in an attempt to provide an improved communication system which is particularly of use in air-to-ground applications, although it is envisaged that it may also be advantageously used for other types of arrangements, for example for communication systems involving ground based vehicles.

According to the invention, there is provided a communication system comprising a plurality of base stations arranged for communication with mobile terminals, each station being allocated to operate at one of nine communications channels, the stations being substantially regularly distributed geographically and the allocation of channels being such that six channels are arranged in a hexagonal distribution with a seventh channel at its centre and two channels are spaced further from the seventh channel than those arranged in the hexagonal distribution.

DESCRIPTION OF PREFERRED EMBODIMENT

Figure 1:
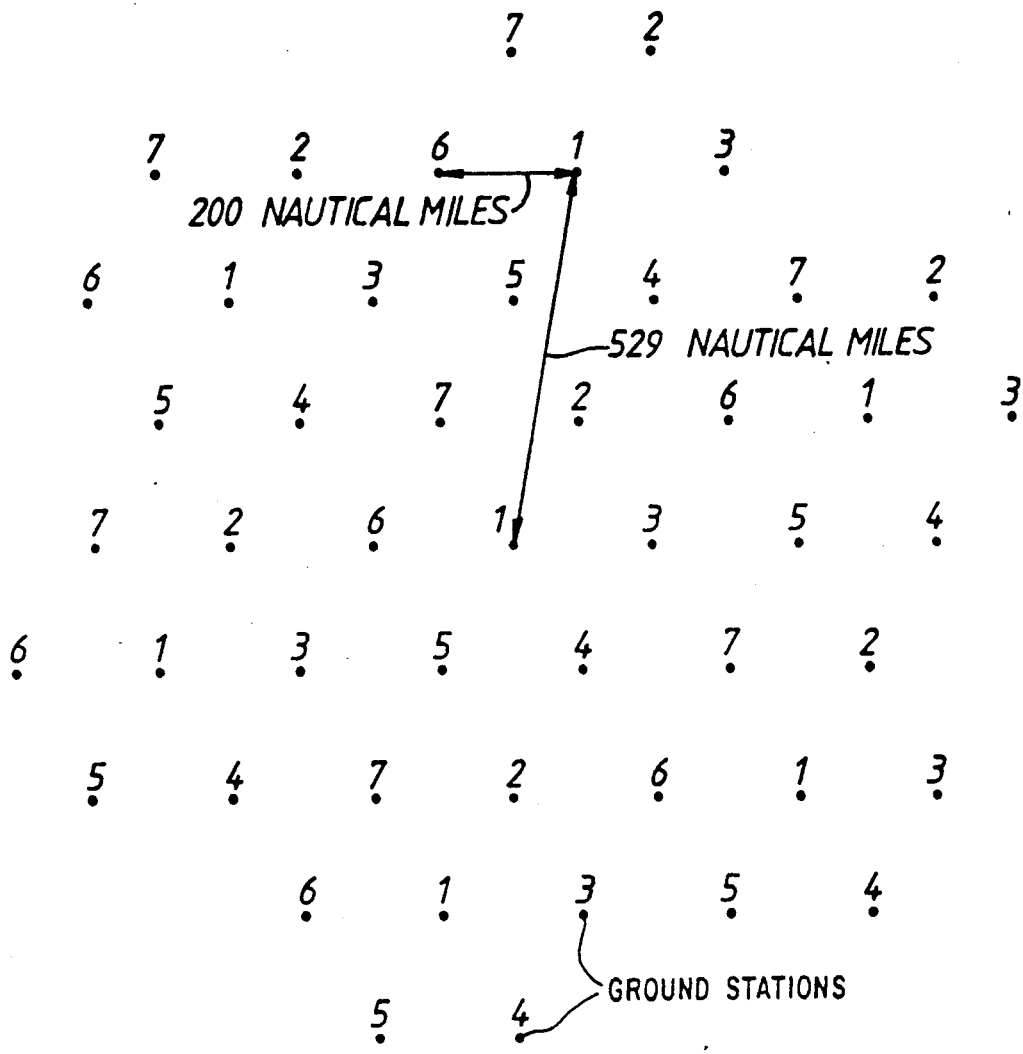
FIG. 1 schematically illustrates ground stations of a conventional air-to-ground communication system which operates on seven channels.
Figure 2:
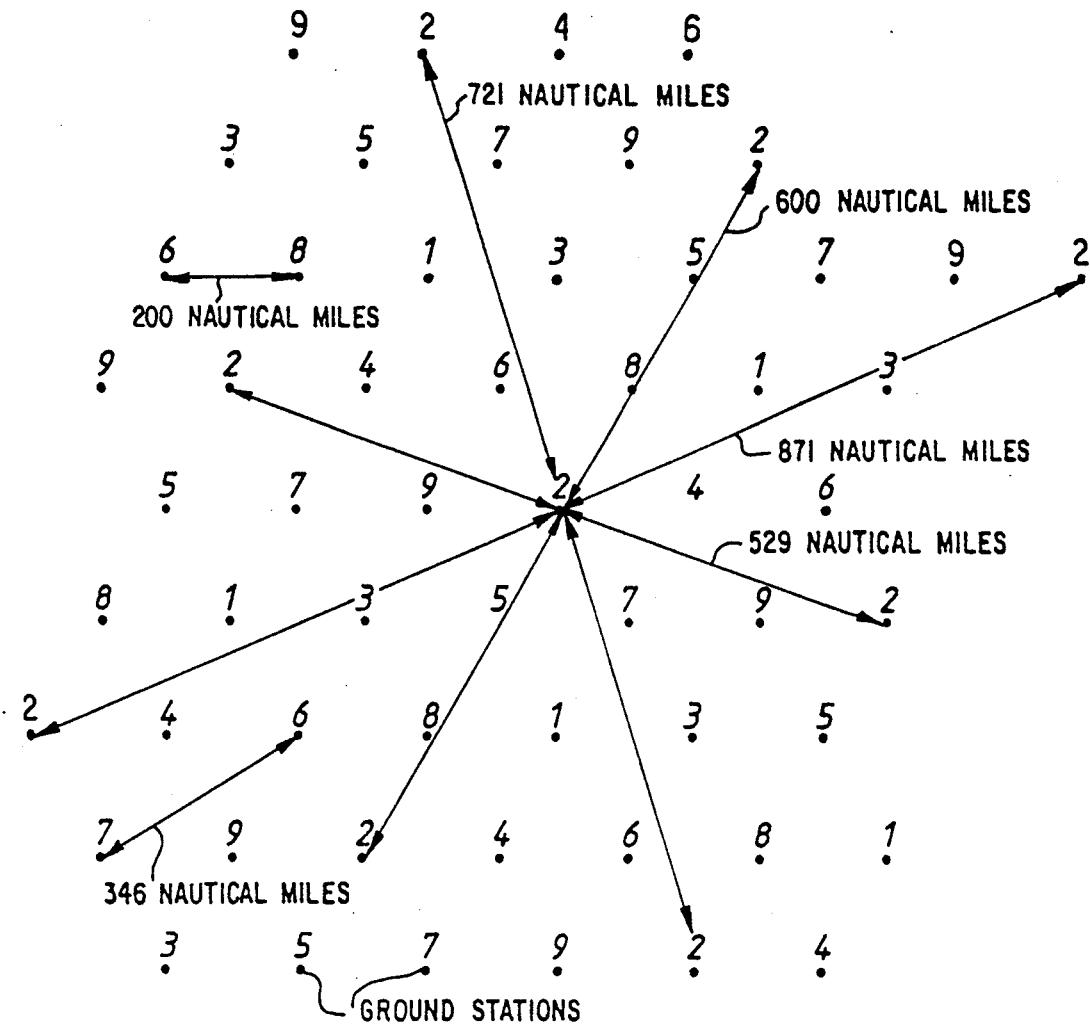
FIG. 2 schematically illustrates a communication system in accordance with the invention.

A communication system in accordance with the invention is illustrated in FIG. 2 in which the points represent ground stations in an air-to-ground communication system and the reference numeral associated with each point indicates on which of nine channels that ground station operates. Each ground station is spaced from adjacent stations by 200 nautical miles, as in the system illustrated in FIG. 1. However, by using nine channels, a greater geographical spacing is possbile between ground stations operating on adjacent channels and also between ground stations operating on the same channels.

In the illustrated arrangement in FIG. 2, the minimum spacing between ground stations allocated the same channel remains the same, being 529 nautical miles. However, in the arrangement illustrated in FIG. 1, each station is surrounded by six staions on the same channel, all at a distance of 529 nautical miles. In the nine channel system in accordance with the invention, each station is surounded by eight ground stations on the same channel, only two of which are at a distance of 529 nautical miles from it. the remainder are further away, at 600 nautical miles, 721 nautical miles and 871 nautical miles. Thus, the operation of the system shown in FIG. 2 is improved over the FIG. 1 arrangement, as it results in a reduced tendency for interference to occur.

In the nine channel arrangement of FIG. 2, the distance between ground stations allocated to adjacent channels is 346 nautical miles, compared to 200 nautical miles in the FIG. 1 arrangement.

As gound stations operating on adjacent channels are spaced further apart, interference between them also is improved compared to the previously known arrangement. This allows a reduction in channel frequency spacing to be achieved which is more than enough to compensate for the increased number of channels used compared with the presently known arrangement.

Figure 3:
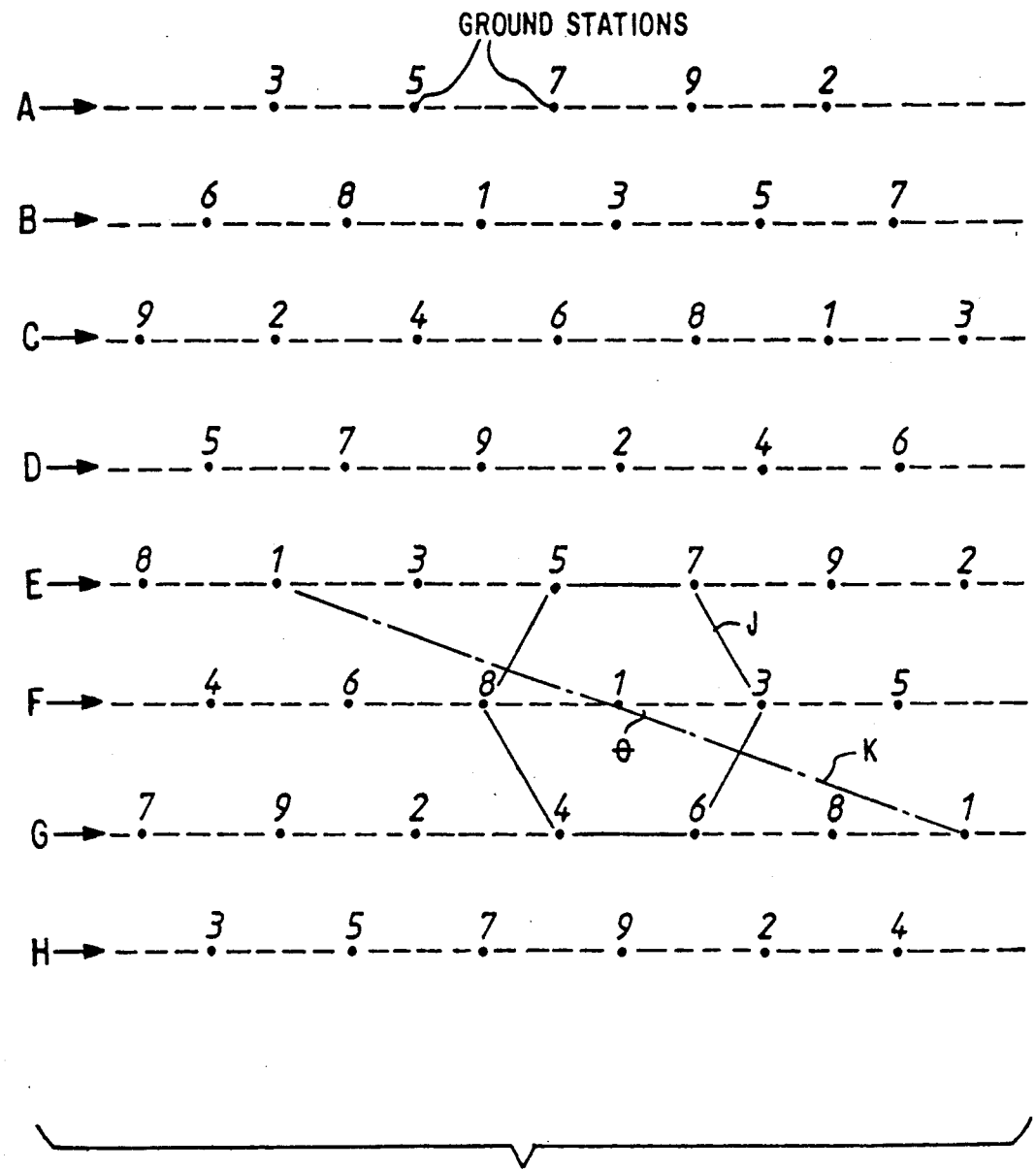
FIG. 3 schematically illustrates the same communication that is shown in FIG. 2, and is provided to permit various relationships to be shown without obscuring FIG. 2.

FIG. 3 duplicates most of the pattern of ground stations and channel allocations shown in FIG. 2, and is presented to facilitate further discussion of various features inherent in FIG. 2. In FIG. 3, the ground stations are illustrated in parallel rows A through H. It should be noted that the channel allocations for the ground stations of each row represent a subset of the channel sequence 1, 3, 5, 7, 9, 2, 4, 6, 8, with this sequence being repeated. For example, in row E, after a ground station operating on channel 8 (the last element of the above-noted seuqence), the sequence begins again with channels 1, 3, 5, and so forth. However the sequence in each row is offset with respect to the sequence in adjacent rows.

For example, consider regular hexagon J in FIG. 3. A pair of adjacent ground stations in row E. operating on channels 5 and 7, are disposed at two of the vertices of hexagon J. A pair of adjacent ground stations in row G, operating on channels 4 and 6, are located at another two vertices of hexagon J, while a pair of spaced-apart ground stations in row F, operating on channels 8 and 3, are disposed at the remaining two vertices of hexagon J. A ground station operating on channel 1 is located at the center of hexagon J. In row E the nearest ground station operating on channel 1 is offset to the left of hexagon J, and in row G the nearest ground station operating on channel 1 is offset to the right. The offsets are such that a straight line K connecting the three stations operating on channel 1 forms at angle $\theta$ of about 20° with respect to row F. Similarly, a straight line connecting the closest three ground stations operating on the same frequency in any three adjacent rows would form an angle of about 20° with respect to the three adjacent rows.

In another embodiment of the invention, there are a plurality of sets of communication channels and each base station is allocated one channel from each of the sets. For example, there may be 27 channels in all and each station is allocated 3 channels on which to operate.

The channel allocations could be 1, 10, and 19 at the first station, 2, 11, and 20 at the second station, and so on.

I claim:

1. A communication system, comprising: a plurality of ground stations disposed in first, second, and third substantially parallel rows, the ground stations being substantially evenly spaced within each row and the spacing between the ground stations being substantially the same for all the rows, the rows being disposed so that a pair of adjacent ground stations in the first row, a pair of adjacent ground stations in the third row, and two ground stations in the second row which are separatated by an intervening ground station of the second row are disposed substantilly at the vertices of a regular hexagon, wherein each ground station is assigned a channel selected from the set consisting of channel number 1, channel number 2, channel number 3, channel number 4, channel number 5, channel number 6, channel number 7, channel number 8, and channel number 9, wherein the ground stations in each row are assigned channel number in accordance with the repeating sequence 1, 3, 5, 7, 9, 2, 4, 6, 8, and wherein the channel assignments for the ground stations of each row are offset so that the intervening ground station in the second row, and the closest ground stations in the first and third rows which have the same channel number as that of the intervening ground station, lie substantially along a straight line which is disposed at an angle of about 20° with respect to the rows.

* * * * *